(12) United States Patent
Blaes et al.

(10) Patent No.: US 12,476,513 B2
(45) Date of Patent: Nov. 18, 2025

(54) ELECTRIC MACHINE

(71) Applicant: Schaeffler Technologies AG & Co. KG, Herzogenaurach (DE)

(72) Inventors: Cedric Blaes, Munchhausen (FR); Bruno Muller, Sasbach (DE); Thomas Niesen, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 262 days.

(21) Appl. No.: 18/037,806

(22) PCT Filed: Oct. 14, 2021

(86) PCT No.: PCT/DE2021/100827
§ 371 (c)(1),
(2) Date: May 19, 2023

(87) PCT Pub. No.: WO2022/105955
PCT Pub. Date: May 27, 2022

(65) Prior Publication Data
US 2023/0412032 A1    Dec. 21, 2023

(30) Foreign Application Priority Data
Nov. 19, 2020 (DE) .......................... 102020130557.5

(51) Int. Cl.
*H02K 5/15* (2006.01)
*H02K 41/00* (2006.01)
(52) U.S. Cl.
CPC ..................... *H02K 5/15* (2013.01)
(58) Field of Classification Search
CPC .................. H02K 5/15; H02K 41/02

USPC ............................. 310/12.01, 85, 89
See application file for complete search history.

(56) References Cited

U.S. PATENT DOCUMENTS

| | | | | |
|---|---|---|---|---|
| 3,873,861 A | * | 3/1975 | Halm | H02K 1/185 |
| | | | | 310/410 |
| 2016/0294247 A1 | | 10/2016 | Bauer | |
| 2016/0354915 A1 | | 12/2016 | Bartoszek et al. | |

FOREIGN PATENT DOCUMENTS

| | | |
|---|---|---|
| DE | 19546023 A1 | 8/1996 |
| DE | 102008064131 A1 | 9/2009 |
| EP | 1458077 A1 | 9/2004 |
| EP | 2166648 A1 | 3/2010 |
| EP | 2946459 A2 | 11/2015 |
| EP | 3226389 A1 | 10/2017 |

(Continued)

*Primary Examiner* — Jose A Gonzalez Quinones
(74) *Attorney, Agent, or Firm* — Volpe Koenig

(57) ABSTRACT

An electric machine, in particular for use within the powertrain of a hybrid or fully electric motor vehicle, having a stator and a rotor, said stator and rotor being received in an engine housing The engine housing has at least one A-bearing shield and at least one B-bearing shield for supporting the rotor relative to the engine housing, wherein the A-bearing shield and/or the B-bearing shield has/have a two-part design, in each case having a respective intermediate inner shield which is arranged axially between the stator and a cover shield that can be fixed to the engine housing, and the intermediate shield receives a bearing for the rotor. The cover shield can be releasably fixed to the intermediate shield side facing away from the stator, and the cover shield has centering means for radially centering the intermediate shield.

14 Claims, 2 Drawing Sheets

(56) References Cited

FOREIGN PATENT DOCUMENTS

| | | | |
|---|---|---|---|
| JP | 2018191449 A | * | 11/2018 |
| JP | 2020108183 A | | 7/2020 |
| WO | 02/103883 A1 | | 12/2002 |
| WO | 2014076083 A2 | | 5/2014 |

* cited by examiner

ELECTRIC MACHINE

CROSS-REFERENCE TO RELATED APPLICATIONS

This application is the U.S. National Phase of PCT Appln. No. PCT/DE2021/100827, filed Oct. 14, 2021, which claims the benefit of German Patent Appln. No. 102020130557.5, filed Nov. 19, 2020, the entire disclosures of which are incorporated by reference herein.

TECHNICAL FIELD

The present disclosure relates to an electric machine, in particular for use in a drive train of a hybrid or fully electrically driven motor vehicle, comprising a stator and a rotor, which are received in a motor housing, wherein the motor housing has at least one D end shield and at least one N end shield for supporting the rotor relative to the motor housing.

BACKGROUND

A generic electric machine comprising a stator and an internally rotating rotor is disclosed in WO 02/103883 A1. To form the transport lock, the stator of the electric machine comprises a radially extending section of a stator carrier with axial passage openings. The rotor has a rotor carrier with axial bores aligned with the passage openings in the stator, in which threaded sleeves are inserted. In this way, the rotor and stator can be secured in position relative to one another by means of a screw connection, which is particularly important for transporting and assembling the electric machine in order to prevent damage to the rotor and/or stator.

SUMMARY

The object of the disclosure is to provide an electric machine that is improved with respect to its transport lock and ease of assembly.

This object is achieved by an electric machine, in particular for use in a drive train of a hybrid or fully electrically driven motor vehicle, comprising a stator and a rotor, which are received in a motor housing, wherein the motor housing has at least one D end shield and at least one N end shield for supporting the rotor relative to the motor housing, wherein the D end shield and/or the N end shield has/have a two-part design, with an intermediate shield in each case, which is arranged axially between the stator and a cover shield that can be fixed to the motor housing, wherein the intermediate shield receives a bearing of the rotor, and the cover shield can be releasably fixed to the side of the intermediate shield facing away from the stator, and the cover shield has a centering means for radially centering the intermediate shield.

This provides the advantage that the functions of torque transmission, centering and absorption of axial forces, which are otherwise combined in one end shield, are decoupled from one another. Furthermore, the tolerance chain from the stator to the rotor can be kept low by the design of the electric machine according to the disclosure, so that the smallest possible air gap can be set between these components and consequently low electromagnetic losses can be realized. The embodiment according to the disclosure also provides a closed, testable electric machine unit.

First, the individual elements of the claimed subject matter of the disclosure are explained in the order in which they are named in the set of claims and particularly preferred embodiments of the subject matter of the disclosure are described below.

Electric machines are used to convert electrical energy into mechanical energy and/or vice versa, and generally comprise a stationary part referred to as a stator, stand, or armature, and a part referred to as a rotor or runner, and arranged to be movable relative to the stationary part. In the case of electric machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator.

A rotor is the rotating (spinning) part of an electric machine. The rotor comprises a rotor shaft and one or more rotor bodies arranged on the rotor shaft in a nonrotatable manner. The rotor shaft can be hollow, which on the one hand results in a weight saving and on the other hand allows the supply of lubricant or coolant to the rotor body.

The motor housing encloses the electric machine. A motor housing can also receive the control and power electronics. The motor housing can furthermore be part of a cooling system for the electric machine, and can be designed in such a way that cooling fluid can be supplied to the electric machine via the motor housing and/or the heat can be dissipated to the outside via the housing surfaces. In addition, the motor housing protects the electric machine and any electronics that might be present from external influences.

A motor housing can be formed in particular from a metallic material. Advantageously, the motor housing can be formed from a cast metal material, such as gray cast iron or cast steel. In principle, it is also conceivable to form the motor housing entirely or partially from a plastic.

End shields are the rear and front covers of the motor housing that protect the inside of the electric machine against contact, for example, and receive the bearings of the shaft ends of the rotor. They are very precisely fitted into the motor housing to ensure that the air gap between the stator and rotor is as uniform as possible. The D end shield designates the output or driven side and usually carries a fixed bearing, the N end shield is the fan side and the bearing arrangement can usually implemented by a sliding fit to compensate for thermal expansion of the rotor.

According to an advantageous embodiment of the disclosure, the intermediate shield can have a double-T-like cross-sectional contour with a radially outer axial section and a radially inner axial section.

The advantage of this design is that, on the one hand, the intermediate shield can be optimized in terms of weight and, on the other hand, a contour is provided for axial as well as radial securing of the intermediate ring by the cover shield.

In accordance with a further preferred further development of the disclosure, the cover shield can be fixed to the radially outer axial section of the intermediate shield. In particular, the cover shield can be connected to the intermediate shield by means of a screw connection. Furthermore, according to an equally advantageous embodiment of the disclosure, the cover shield can additionally or alternatively be fixed to the radially inner axial section of the intermediate shield. Fixing to both the inner and outer axial sections provides the advantage of a particularly secure and defined connection between the components.

According to a further particularly preferred embodiment of the disclosure, the centering means of the cover shield can be formed as an axial section projecting in the axial direction from the cover shield, which engages in the double-T contour radially between the outer axial section and the inner axial section of the intermediate shield in such a way that the radial position of the intermediate shield is fixed. For example, the axial section can be designed as a cylindrical ring or a plurality of axial sections arranged on a circular path.

Furthermore, the disclosure can also be further developed in such a way that the axial section of the cover shield rests against the radially outer lateral surface of the inner axial section of the intermediate shield, thus enabling particularly simple and secure centering.

In a likewise preferred embodiment of the disclosure, the radial connection between the outer axial section and the inner axial section of the intermediate shield can be of a spoke-like design.

This makes it possible to further optimize the intermediate shield in terms of weight.

It can also be advantageous to further develop the disclosure in such a way that the intermediate shield is formed from a cast metal material, in particular gray cast iron. The advantage of this is that the intermediate shield can be formed particularly cost-effectively with only a few finishing steps.

BRIEF DESCRIPTION OF THE DRAWINGS

The disclosure will be explained in more detail below with reference to figures without limiting the general concept of the disclosure.

In the figures.

DETAILED DESCRIPTION

Figure 1:
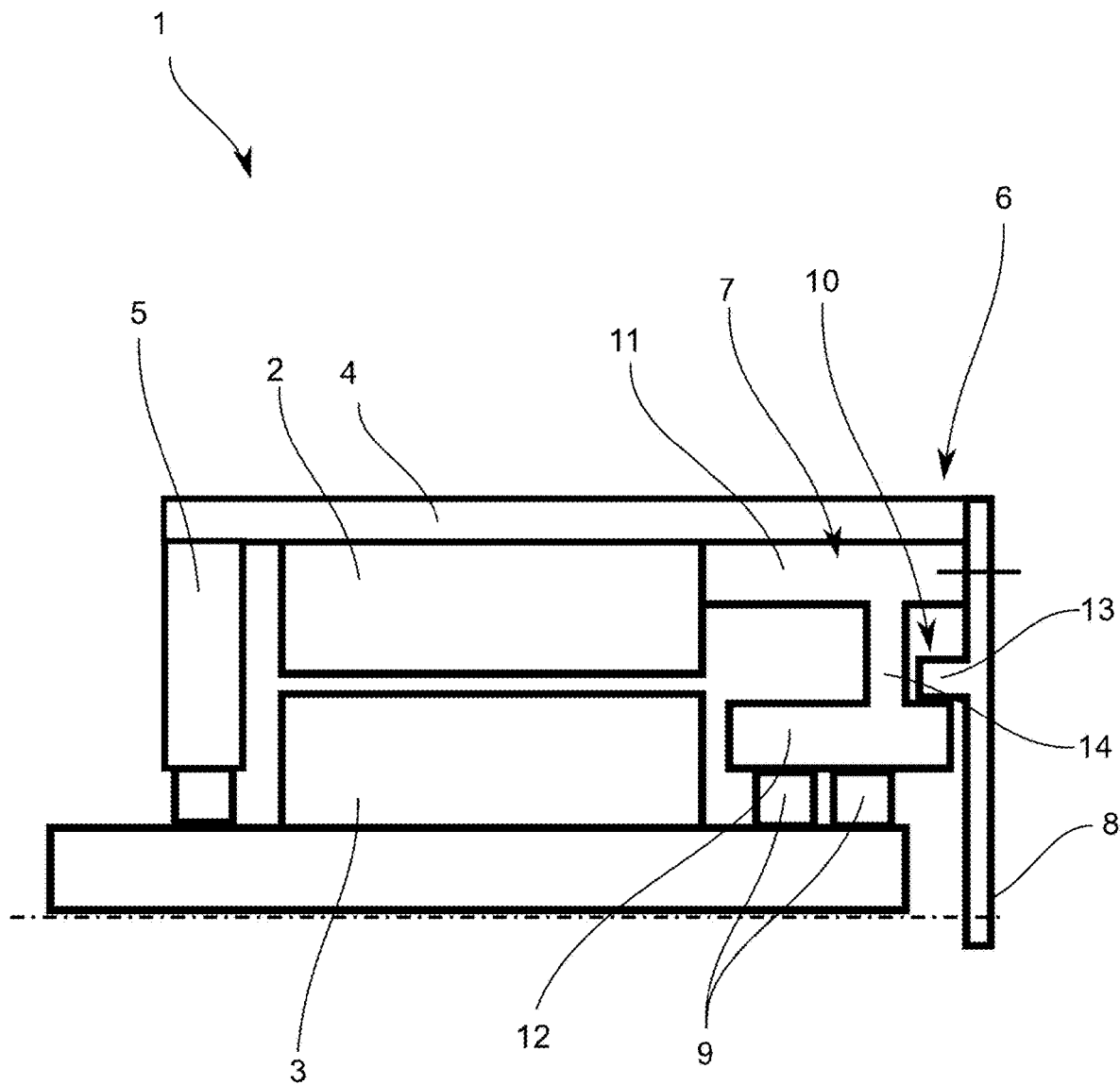
FIG. 1 shows a first embodiment of an electric machine in a schematic longitudinal sectional view.

FIG. 1 shows a first embodiment of an electric machine 1, in particular for use in a drive train of a hybrid or fully electrically driven motor vehicle, comprising a stator 2 and a rotor 3, which are received in a motor housing 4. The motor housing 4 has a D end shield 5 and an N end shield 6 for supporting the rotor 3 relative to the motor housing 4. In the embodiment shown, the N end shield 6 is of two-part design, with an intermediate shield 7 in each case, which is arranged axially between the stator 2 and a cover shield 8 that can be fixed to the motor housing 4. The intermediate shield 7 receives a bearing 9 of the rotor 3. The cover shield 8 can be releasably fixed to the side of the intermediate shield 7 facing away from the stator 2. In the embodiment shown, this fixation is realized by means of a screw connection not specified in further detail.

The cover shield 8 also has a centering means 10 for radially centering the intermediate shield 7, the operating principle of which is explained in more detail below.

FIG. 1 shows that the intermediate shield 7 has a double-T-like cross-sectional contour with a radially outer axial section 11 and a radially inner axial section 12. The cover shield 8 is fixed to the radially outer axial section 11 of the intermediate shield 7 by means of a screw connection.

The centering means 10 of the cover shield 8 is formed as an axial section 13 projecting in the axial direction from the cover shield 8, which engages in the double-T contour radially between the outer axial section 11 and the inner axial section 10 of the intermediate shield 7 in such a way that the radial position of the intermediate shield 7 is fixed. For this purpose, the axial section 13 of the cover shield 8 rests against the radially outer lateral surface of the inner axial section 10 of the intermediate shield 7.

The radial connection 14 between the outer axial section 11 and the inner axial section 10 of the intermediate shield 7 can, in particular, be of a spoke-like design. The intermediate shield 8 is formed from a cast metal material, in particular gray cast iron.

Figure 2:
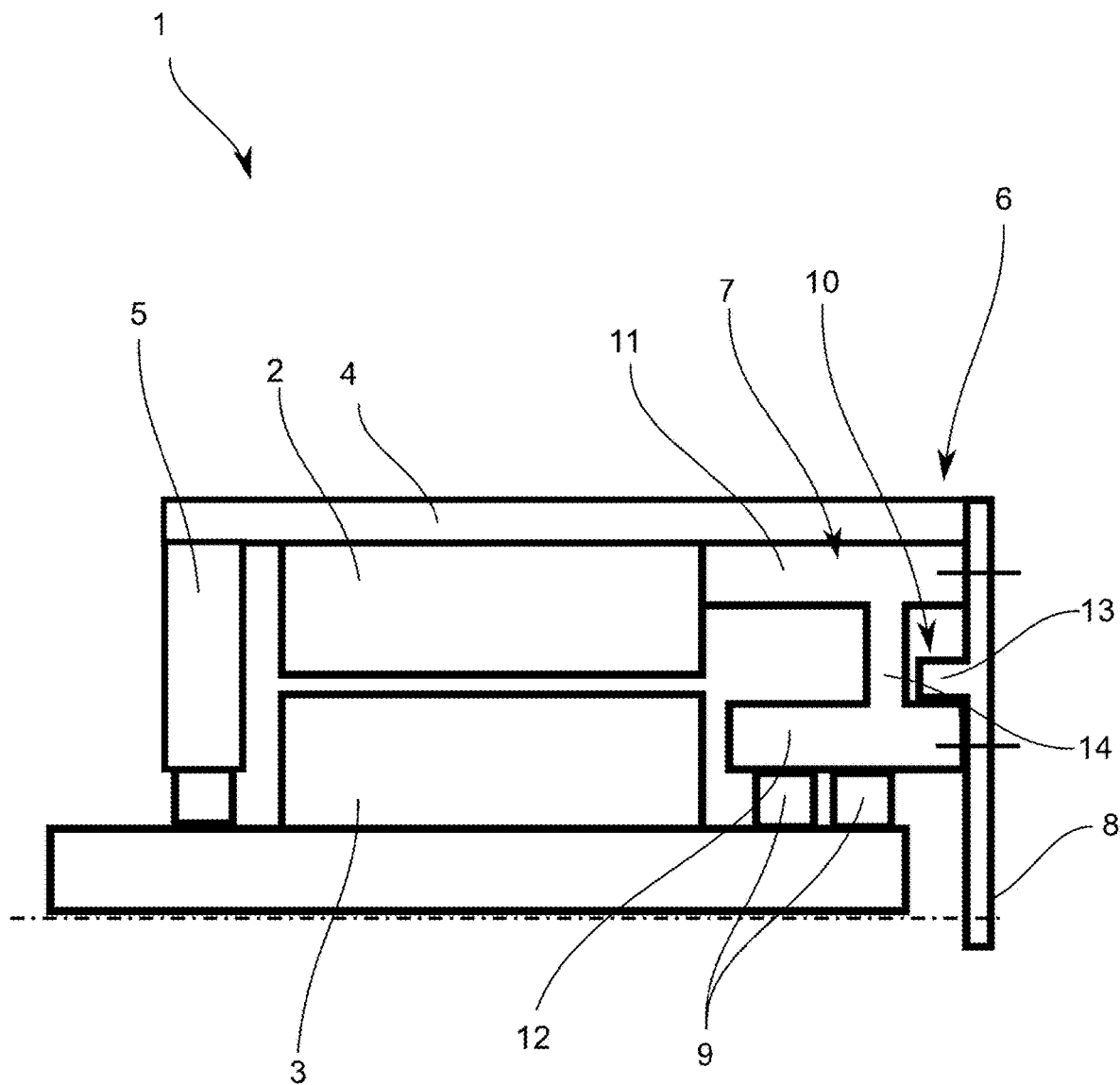
FIG. 2 shows a second embodiment of an electric machine in a schematic longitudinal sectional view.

FIG. 2 shows a further embodiment of the disclosure in which, in addition to the screw connection on the radially outer axial section 11 of the intermediate shield 7, the cover shield 8 is fixed on the radially inner axial section 12 of the intermediate shield 7.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Machine
2 Stator
3 Rotor
4 Motor housing
D end shield
6 N end shield
7 Intermediate shield
8 Cover shield
9 Bearing
10 Centering means
11 Axial section
12 Axial section
13 Axial section
14 Connection

The invention claimed is:

1. An electric machine for use within a drive train of a hybrid or fully electrically driven motor vehicle, comprising a stator and a rotor received in a motor housing, wherein the motor housing has at least one D end shield and at least one N end shield for supporting the rotor relative to the motor housing,
wherein at least one of
the D end shield or the N end shield has a two-part design, with an intermediate shield arranged axially between the stator and a cover shield fixed to the motor housing,
wherein the intermediate shield receives a bearing of the rotor, and
the cover shield is releasably fixed to a side of the intermediate shield facing away from the stator, and
the cover shield has a centering element for radially centering the intermediate shield, and
wherein the intermediate shield has a double-T cross-sectional contour with a radially outer axial section and a radially inner axial section.

2. The electric machine according to claim 1, wherein the cover shield is fixed to the radially outer axial section of the intermediate shield.

3. The electric machine according to claim 2, wherein the cover shield is fixed to the radially inner axial section of the intermediate shield.

4. The electric machine according to claim 3, wherein the centering element of the cover shield comprises an axial section which projects in an axial direction from the cover shield and is engaged in the double-T contour radially between the outer axial section and the inner axial section of the intermediate shield to fix a radial position of the intermediate shield.

5. The electric machine according to claim 4, wherein the axial section of the cover shield rests against a radially outer lateral surface of the inner axial section of the intermediate shield.

6. The electric machine according to claim 2, wherein a radial connection between the outer axial section and the inner axial section of the intermediate shield comprises a spoke.

7. The electric machine according to claim 1, wherein the intermediate shield is comprised of a cast metal material.

8. An electric machine for a drive train of a hybrid or fully electrically driven motor vehicle, comprising:
   a stator;
   a rotor; and
   a motor housing in which the stator and rotor are received;
   wherein the motor housing includes a body and at least one D end shield and at least one N end shield for supporting the rotor relative to the body;
   wherein at least one of the D end shield or the N end shield includes an intermediate shield and a cover shield;
   wherein the cover shield is fixed to the body;
   wherein the intermediate shield is arranged axially between the stator and the cover shield;
   wherein the intermediate shield receives a bearing of the rotor; and
   wherein the cover shield is releasably fixed to a side of the intermediate shield facing away from the stator;
   wherein the cover shield includes a centering element for radially centering the intermediate shield; and
   wherein the intermediate shield has a double-T cross-sectional contour with a radially outer axial section and a radially inner axial se.

9. The electric machine according to claim 8, wherein the cover shield is fixed to the radially outer axial section of the intermediate shield.

10. The electric machine claim 9, wherein the cover shield is fixed to the radially inner axial section of the intermediate shield.

11. The electric machine according to claim 10, wherein the centering element of the cover shield comprises an axial section which projects in an axial direction from the cover shield and is engaged in the double-T contour radially between the outer axial section and the inner axial section of the intermediate shield to fix a radial position of the intermediate shield.

12. The electric machine according to claim 11, wherein the axial section of the cover shield rests against a radially outer lateral surface of the inner axial section of the intermediate shield.

13. The electric machine according to claim 8, wherein a radial connection between the outer axial section and the inner axial section of the intermediate shield comprises a spoke.

14. The electric machine according to claim 1, wherein the intermediate shield is comprised of a cast metal material.

\* \* \* \* \*